United States Patent [19]
Kawabata et al.

[11] Patent Number: 5,974,650
[45] Date of Patent: Nov. 2, 1999

[54] TRANSMISSION ASSEMBLING APPARATUS AND METHOD

[75] Inventors: Akihiro Kawabata, Takefu; Hirohisa Shintoku, Tokyo; Takahiro Kikukawa, Kumamoto, all of Japan

[73] Assignee: Hirata Corporation, Tokyo, Japan

[21] Appl. No.: 08/671,639

[22] Filed: Jun. 28, 1996

[51] Int. Cl.$^6$ .................................................. B23Q 3/00
[52] U.S. Cl. .............................. 29/468; 29/281.5; 29/714
[58] Field of Search .................................. 29/240, 281.5, 29/434, 464, 468, 714, 893.1

[56] References Cited

U.S. PATENT DOCUMENTS

| | | | |
|---|---|---|---|
| 4,794,690 | 1/1989 | Yamanaga et al. | . |
| 4,879,797 | 11/1989 | Yoshioka et al. | 29/281.5 |
| 4,887,344 | 12/1989 | Kurihara et al. | 29/468 |
| 5,086,555 | 2/1992 | Broadway | 29/281.05 X |
| 5,383,652 | 1/1995 | Van Den Berg | 29/281.5 X |
| 5,459,918 | 10/1995 | Uchida et al. | 29/434 |

FOREIGN PATENT DOCUMENTS 493130  3/1992  Japan .

OTHER PUBLICATIONS

Abstract of Japanese patent 08-215,948, "Work Assembly Device and Work Assembly Method", Akihiro Kawabata et al., Aug. 1996.

Abstract of Japanese patent 08-215,947, Work Assembly Device and Work Assembly Method, Akihiro et al., Aug. 1996.

*Primary Examiner*—David P. Bryant
*Attorney, Agent, or Firm*—Burns, Doane, Swecker & Mathis, LLP

[57] ABSTRACT

In a workpiece assembling apparatus for assembling a torque converter to a transmission, a moving table and an inserting table are supported so as to approach and leave the transmission positioned. A suction pad for holding the torque converter is provided rotatably by a rotating shaft on the inserting table. The rotating shaft is rotated by a driving rotary unit to rotate the torque converter attracted and held by the suction pad to center it. Then, the torque converter is brought together with the inserting table close to the transmission, and pressed against it. Simultaneously, the torque converter is rotated about the axis of fitting. If the torque converter and the transmission are not fitted together, the torque converter is caused to reciprocate back and forth by the pusher cylinder 57 so that they will be fitted together.

8 Claims, 14 Drawing Sheets

TRANSMISSION ASSEMBLING APPARATUS AND METHOD

BACKGROUND OF THE INVENTION

This invention relates to a workpiece assembling apparatus and a workpiece assembling method by which to locate a workpiece at a predetermined position, bring another workpiece set in place close to the workpiece, and fit the latter workpiece to the former workpiece, such as those for assembling a torque converter to a transmission in an automatic transmission.

An assembly operation for an automatic transmission of an automobile includes a step for assembling a torque converter to a transmission. FIG. 14 shows an outline of an ordinary transmission having a torque converter assembled thereto.

As shown in FIG. 14, an input shaft 13 is rotatably supported in a transmission case 12 of a transmission 11, and various speed change gears (not shown) are mounted on the input shaft 13. On one end side of the input shaft 13 in the transmission case 12 is mounted an oil pump 14, and a torque converter 16 is mounted in a converter housing 15 attached to the transmission case 12. The torque converter 16 is housed in a pump housing 18 having a boss portion 17. Thus, the driving force of an engine (not shown) is transmitted to the input shaft 13 via the torque converter 16 and a clutch and a planetary gear (not shown), and is then transmitted to a transfer shaft via the respective gears.

In such an assembling operation for the transmission 11, it has been customary practice that an operator withdraws the torque converter 16 inside a pallet, and assembles this torque converter 16 manually to the converter housing 15 of the transmission 11 on a conveyor.

In assembling the torque converter 16 to the transmission 11, their fitting portions must be fitted together in an appropriate manner. That is, five fitting portions, i.e., two splined fitting portions A, B, an oil pump fitting portion C, and oil seal fitting portions D, E, are present between the torque converter 16 and the input shaft 13. Thus, unless the respective fitting portions A, B. C, D and E are appropriately fitted even when the torque converter 16 is fitted over the input shaft 13 of the transmission 11, the torque converter 16 cannot be assembled to the transmission 11. In this respect, a conventional assembly operation for the torque converter 16 by an operator has been tiresome, and has taken time for positioning in fitting, resulting in a low work efficiency. Moreover, until the positioning for fitting is completed, the operator must hold the torque converter 16, shouldering a heavy burden.

An apparatus for automatically assembling a torque converter to a transmission is disclosed, for instance, in Japanese Laid-Open Patent Publication No. 4-93130. A conventional "assembling apparatus" disclosed in this publication engages a torque converter from above with a transmission laid at a predetermined position. That is, the torque converter suspended from a suspension system is lowered toward the transmission by a lifting device to bring the engaging portions of these parts into contact. On this occasion, their engaging portions are lightly pressed against each other by an air cylinder. By rotating a rotating plate by means of a pulse motor, those engaging portions come into alignment, and become fitted. Under the urging force of the air cylinder, the torque converter descends to the transmission. This descent is detected by a detecting means of the rotating plate, issuing a rotation stop signal to the pulse motor, which stops the rotating plate. At the same time, a descent signal is outputted to the lifting device, lowering the suspension system, with the result that the torque converter is completely coupled to the transmission.

In the above-described conventional apparatus for assembling a torque converter to a transmission, the suspended torque converter is lowered by the lifting device, whereby the engaging shaft tube is contacted with the splined shaft of the transmission. With them being pressed against each other by the air cylinder, the rotating plate is rotated by the pulse motor, whereby their phases are brought into agreement, leading to their fitting.

Before the transmission is assembled, its splined shaft is usually free from engagement. When the engaging shaft tube of the torque converter is rotated while being pressed against the splined shaft of the transmission, the splined shaft also makes a rotation jointly with the engaging shaft tube owing to this pressure although the torque converter and the transmission are not engaged. This poses the problem that their phases do not easily agree, and no engagement is obtained.

With the conventional assembling apparatus, therefore, if the splined shaft of the transmission rotates together with the engaging shaft tube of the torque converter in an unengaged state, the torque converter must be lifted, and the same procedure performed again. Thus, assembly work becomes complicated, and requires a long time to complete.

Furthermore, the torque converter before assembly contains an oil for product testing. If the torque converter is suspended vertically by the lifting device, the inside remaining oil may leak, staining the transmission and the surrounding equipment.

SUMMARY OF THE INVENTION

This invention is designed to solve the foregoing problems, and its object is to provide an apparatus and a method for assembling workpieces with improved efficiency of assembly by performing the engagement of the workpieces in a short time without fail.

The present invention for attaining the above object concerns a workpiece assembling apparatus for assembling a pair of workpieces to be fitted to each other, by positioning one of the workpieces at a predetermined position, bringing the other workpiece close to that one workpiece, and fitting them together, the apparatus comprising a moving table supported so as to approach and leave the positioned one workpiece, moving table driving means for moving the moving table, workpiece holding means provided on the moving table for holding the other workpiece, workpiece rotating means for rotating one of the workpieces about the axis of fitting when the workpieces are to be fitted together, and workpiece advancing and retracting means for finely moving one of the workpieces away from the other workpiece when the workpieces are to be fitted together.

The invented workpiece assembling apparatus works by the following mechanism: One of a pair of workpieces to be fitted to each other is positioned at a predetermined position. The other workpiece is held on the moving table by the workpiece holding means. The moving table is moved by the moving table driving means toward the one workpiece to bring the held workpiece close thereto. On this occasion, one of the workpieces is rotated by the workpiece rotating means. At the same time, one of the workpieces is finely moved away from the other workpiece by the workpiece advancing and retracting means. Consequently, the pair of workpieces fall out of phase of rotation without making a co-rotation, and eventually get in phase and fit each other, resulting in assembly. Thus, the pair of workpieces can be easily phase aligned and fitted in a short period of time, thus improving the efficiency of a workpiece assembly operation.

The workpiece assembling apparatus of the present invention is also characterized in that it includes workpiece fitting detecting means for detecting the state of fitting of the pair of workpieces, and if the workpiece fitting detecting means detects the pair of workpieces not to be fitted together when they ought to be fitted together, the workpiece advancing and retracting means advances or retracts the one of the workpieces.

Thus, when the pair of workpieces ought to be fitted together, the workpiece fitting detecting means detects the state of their fitting. If it finds them not to be fitted together, the workpiece advancing and retracting means advances or retracts one of the workpieces. As a result, the phases of the pair of workpieces are aligned, and their fitting can be performed properly in a short time, ensuring an accurate short-term workpiece assembly operation.

The workpiece assembling apparatus of the present invention is also characterized in that when the pair of workpieces are to be fitted together, the workpiece rotating means rotates one of the pair of workpieces normally or reversely at regular intervals.

Thus, when the pair of workpieces are to be fitted together, the workpiece rotating means rotates one of the pair of workpieces normally or reversely at regular intervals. Hence, the phases of rotation of the pair of workpieces can be aligned in a short time, ensuring an accurate short-term fitting of the workpieces.

The workpiece assembling apparatus of the present invention is also characterized in that the moving table is divided in the back-and-forth direction of its movement into a front moving table and a rear moving table, the front moving table and the rear moving table are supported so as to be movable relative to each other, the front moving table is provided with the workpiece holding means, the front moving table driving means is disposed between the front moving table and rear moving table, the workpiece advancing and retracting means is disposed therebetween via a locking means, and when the workpiece advancing and retracting means is driven, the locking means is actuated so that the workpiece advancing and retracting means can advance or retract the workpiece held by the workpiece holding means of the front moving table.

Thus, when the locking means is not in operation, the movement of the front moving table by the workpiece advancing and retracting means is impossible, whereas when the locking means is in operation, the movement of the front moving table by the workpiece advancing and retracting means is possible, thus permitting the advancement or retraction of the workpiece and facilitating the fitting of the pair of workpieces.

The present invention also relates to a workpiece assembling apparatus for assembling a pair of workpieces to be fitted to each other, by positioning one of the workpieces at a predetermined position, bringing the other workpiece close to that one workpiece, and fitting them together, the apparatus comprising a moving table supported so as to approach and leave the positioned one workpiece in a horizontal direction, moving table driving means for moving the moving table, workpiece holding means provided on the moving table for holding the other workpiece, and workpiece rotating means for rotating the one of the workpieces about the axis of fitting before the fitting of the workpieces so that the one of the workpieces will be centered relative to the remaining workpiece.

Thus, one of a pair of workpieces to be fitted to each other is positioned at a predetermined position. The other workpiece is held on the moving table by the workpiece holding means. With the other workpiece being held in this condition, the other workpiece is rotated by the workpiece rotating means before the fitting of the workpieces so as to perform the centering of the other workpiece. The moving table is moved horizontally by the moving table driving means to bring the held and centered workpiece close to the one workpiece. Thus, the phases of the pair of workpieces come into alignment, resulting in assembly. Since the pair of workpieces are centered without their postures being changed, they can be easily fitted together in a short period of time, thus improving the efficiency of a workpiece assembly operation.

The workpiece assembling apparatus of the present invention is also characterized in that the moving table is divided in the back-and-forth direction of its movement into a front moving table and a rear moving table, the front moving table and the rear moving table are supported so as to be movable relative to each other, the front moving table is provided with the workpiece holding means, while the rear moving table is provided with the workpiece rotating means, and driving force transmitting means are provided which, regardless of the relative positions of the front moving table and the rear moving table, transmit the rotating force of the workpiece rotating means to the workpiece held by the workpiece holding means to rotate the workpiece.

Thus, the front moving table holding the other workpiece can be downsized, and the moving table driving means can also be downsized.

The workpiece assembling apparatus of the present invention is also characterized in that a rate at which the workpiece is rotated by the workpiece rotating means before the fitting of the pair of workpieces is set at 70 to 200 rpm.

Thus, the phases of the rotation of the pair of workpieces are aligned in a short time, so that their fitting can be performed reliably in a short time.

The present invention also relates to a workpiece assembling method for assembling a pair of workpieces to be fitted to each other, comprising the steps of positioning one of the workpieces at a predetermined position, bringing the other workpiece close to the positioned one workpiece, the other workpiece being held on a moving table supported so as to approach and leave the positioned one workpiece; with the other workpiece being held in this condition, moving the moving table close to the positioned workpiece to press the other workpiece against the positioned workpiece for fitting; and rotating the other workpiece about an axis of fitting, whereupon the other workpiece is advanced or retracted for fitting when the pair of workpieces are not fitted together.

Thus, one of the workpieces is positioned at a predetermined position, while the other workpiece is held on the moving table. With the other workpiece being held in this condition, the moving table is brought close to the one workpiece to press the other workpiece against the one workpiece. At the same time, the other workpiece is rotated. If, at this time, the pair of workpieces are not fitted together, the other workpiece is advanced or retracted. Thus, the pair of workpieces achieve aligned phases of rotation without making a co-rotation. As a result, they are fitted together, resulting in assembly. Since their phases of rotation are aligned without co-rotation at the time of fitting, the pair of workpieces can be easily fitted together in a short period of time, thus improving the efficiency of a workpiece assembly operation.

The present invention further relates to a workpiece assembling method for assembling a pair of workpieces to be fitted to each other, comprising the steps of: positioning one of the workpieces at a predetermined position, bringing the other workpiece close to the positioned one workpiece by holding the other workpiece on a moving table supported so as to approach and leave the positioned one workpiece in a horizontal direction, and rotating the other workpiece in its held condition to perform its centering, wherein the bringing step brings the moving table close to the positioned one workpiece to press the other workpiece against the one workpiece and fit the workpieces to each other.

Thus, one of the workpieces is positioned at a predetermined position. The other workpiece is held on the moving table. Held in this condition, the other workpiece is rotated for centering. Then, the moving table is moved horizontally to bring the held and centered workpiece close to the one workpiece. Thus, the phases of the pair of workpieces come into alignment, resulting in assembly. Since the workpiece is centered without its posture being changed, the pair of workpieces can be easily fitted together in a short period of time, thus improving the efficiency of a workpiece assembly operation.

BRIEF DESCRIPTION OF THE DRAWINGS

The present invention will become more fully understood from the detailed description hereinbelow in conjunction with the accompanying drawings which are given for the purpose of illustration only, and thus are not limitative to the present invention, and wherein.

DETAILED DESCRIPTION OF THE PREFERRED EMBODIMENT

A preferred embodiment of the present invention will be described in detail by reference to the accompanying drawings. In the embodiment illustrated, a workpiece assembling apparatus of the present invention will be explained by way of a torque converter assembling apparatus for assembling a torque converter to a transmission.

Figure 8:
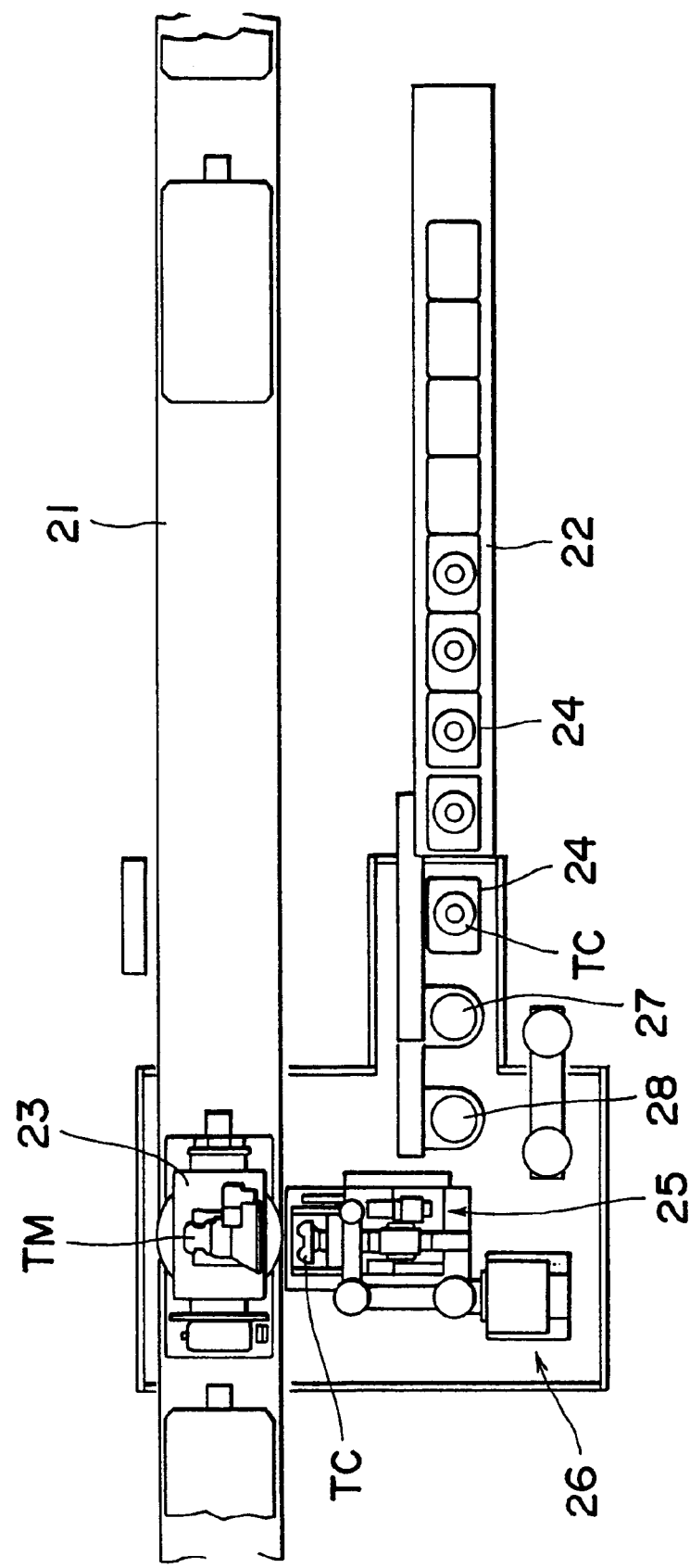
FIG. 8 is a layout drawing of an assembly line where the torque converter assembling apparatus of the instant embodiment is installed.

As shown in FIG. 8, a transmission TM and a torque converter TC are carried on pallets 23, 24, respectively, conveyed on conveyors 21, 22 arranged in parallel. At an intermediate portion of the conveyor 21 for the transmission TM but a rear end portion of the conveyor 22 for the torque converter TC is installed a torque converter assembling apparatus 25 of the instant embodiment. Also installed there is a manipulating robot 26 for making the torque converter TC on the pallet 24 held on the torque converter assembling apparatus 25. Downstream of the conveyor 22 are provided a model confirmation area 27 and a standby area 28 adjacent to the conveyor 21. The model confirmation area 27 detects the type of the conveyed torque converter TC by means of an image processing unit or the like to make sure whether it is a prescribed model. The standby area 28, on the other hand, puts the torque converter TC, whose model has been confirmed, on standby for a subsequent assembly operation. Transfer of the torque converter TC among the conveyor 22, the model confirmation area 27 and the standby area 28 is performed by a transfer device (not shown).

Figure 1:
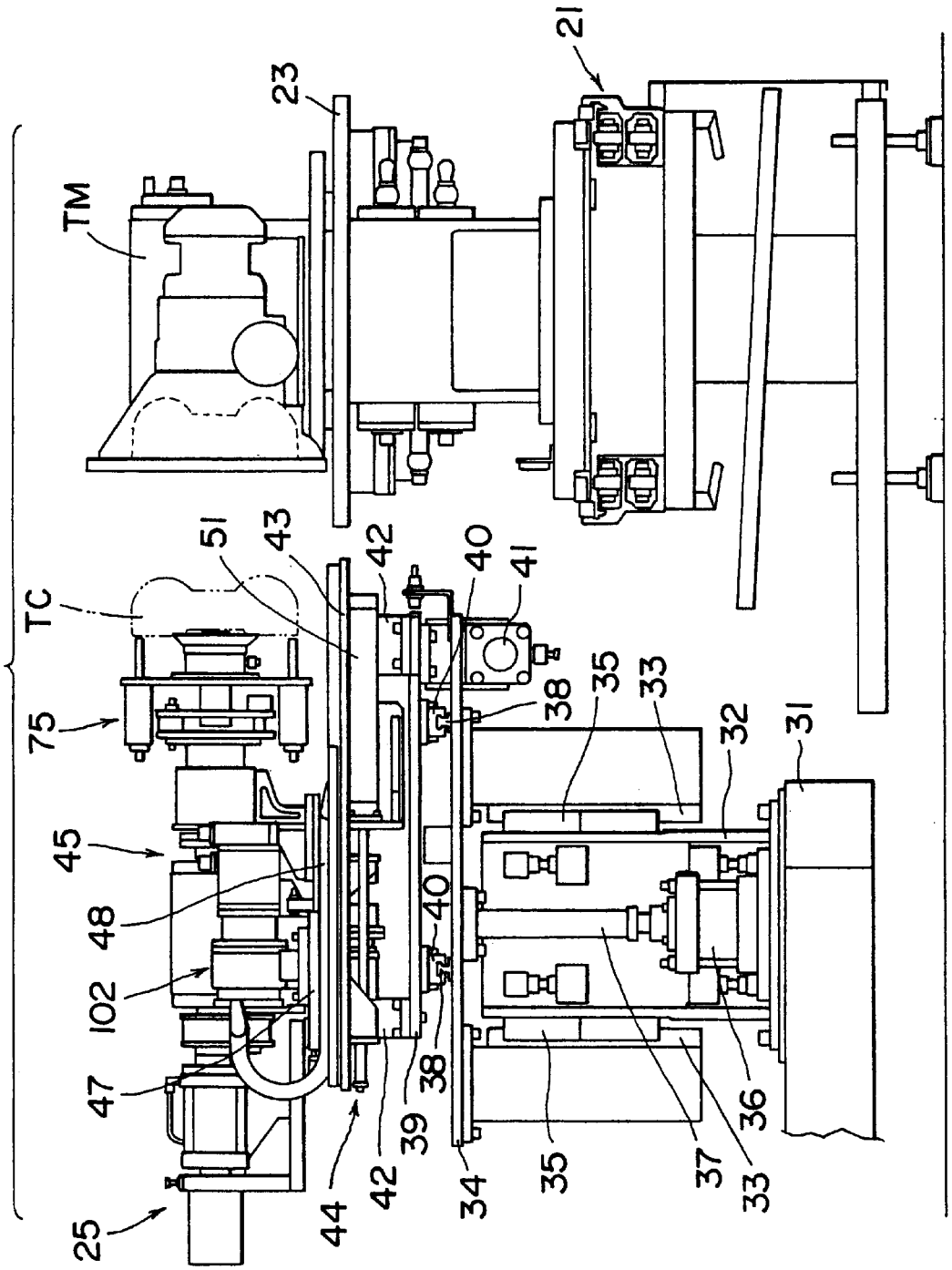
FIG. 1 is a front view of a torque converter assembling apparatus concerned with an embodiment of the present invention.

In the torque converter assembling apparatus 25, a supporting tube 32 is erected on a base 31, as shown in FIG. 1. Outside the supporting tube 32 are fixed a pair of vertical guide rails 33. At a lower part of an ascending and descending plate 34 located above the supporting tube 32 are fixed a pair of guide members 35 fitting slidably on the guide rails 33. The ascending and descending plate 34 is supported so as to be capable of ascending and descending in the direction of Z relative to the supporting tube 32. On the base 31 is mounted a lifting and lowering cylinder 36 having a driving rod 37 whose front end portion is coupled to the lifting and lowering plate 34. Thus, the ascending and descending plate 34 can be lifted and lowered by the lifting and lowering cylinder 36. On the upper surface of the ascending and descending plate 34 are fixed a pair of horizontal guide rails 38. At a lower part of a moving plate 39 positioned above the ascending and descending plate 34 are fixed a pair of guide members 40 which fit slidably on the pair of guide rails 38, so that the moving plate 39 is supported so as to be movable horizontally. To the ascending and descending plate 34 is mounted a horizontal cylinder 41 having a driving rod (not shown) whose front end portion is coupled to the moving plate 39. By the action of this horizontal cylinder 41, the moving plate 39 can be moved in the direction X (see FIG. 3 and FIG. 7).

On the moving plate 39 is fixed a supporting plate 43 via a coupling bracket 42. On the supporting plate 43 is supported a torque converter inserting device 45 so as to be movable in the direction of Y by a torque converter moving mechanism 44. The torque converter inserting device 45 approaches the transmission TM positioned on the pallet 23 of the conveyor 21, while holding the torque converter TC. Then, it assembles the held torque converter TC to the transmission TM.

The torque converter inserting device 45 will now be described concretely. First, the torque converter moving mechanism 44 which supports the torque converter inserting device 45 in a freely moving manner will be described by reference to FIG. 6 and FIG. 7. These drawings illustrate only the torque converter moving mechanism 44 with the torque converter inserting device 45 being omitted, for detailed representation of the structure.

Figure 6:
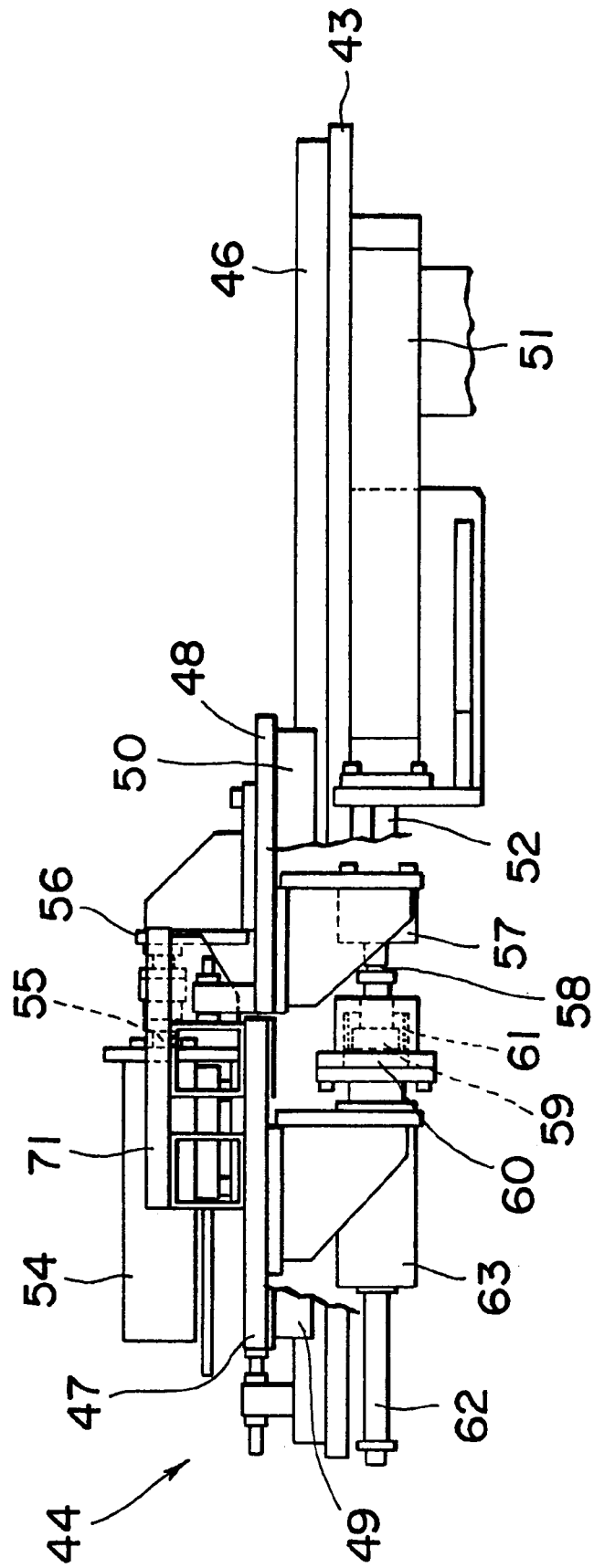
FIG. 6 is a front view of a torque converter moving mechanism.
Figure 7:
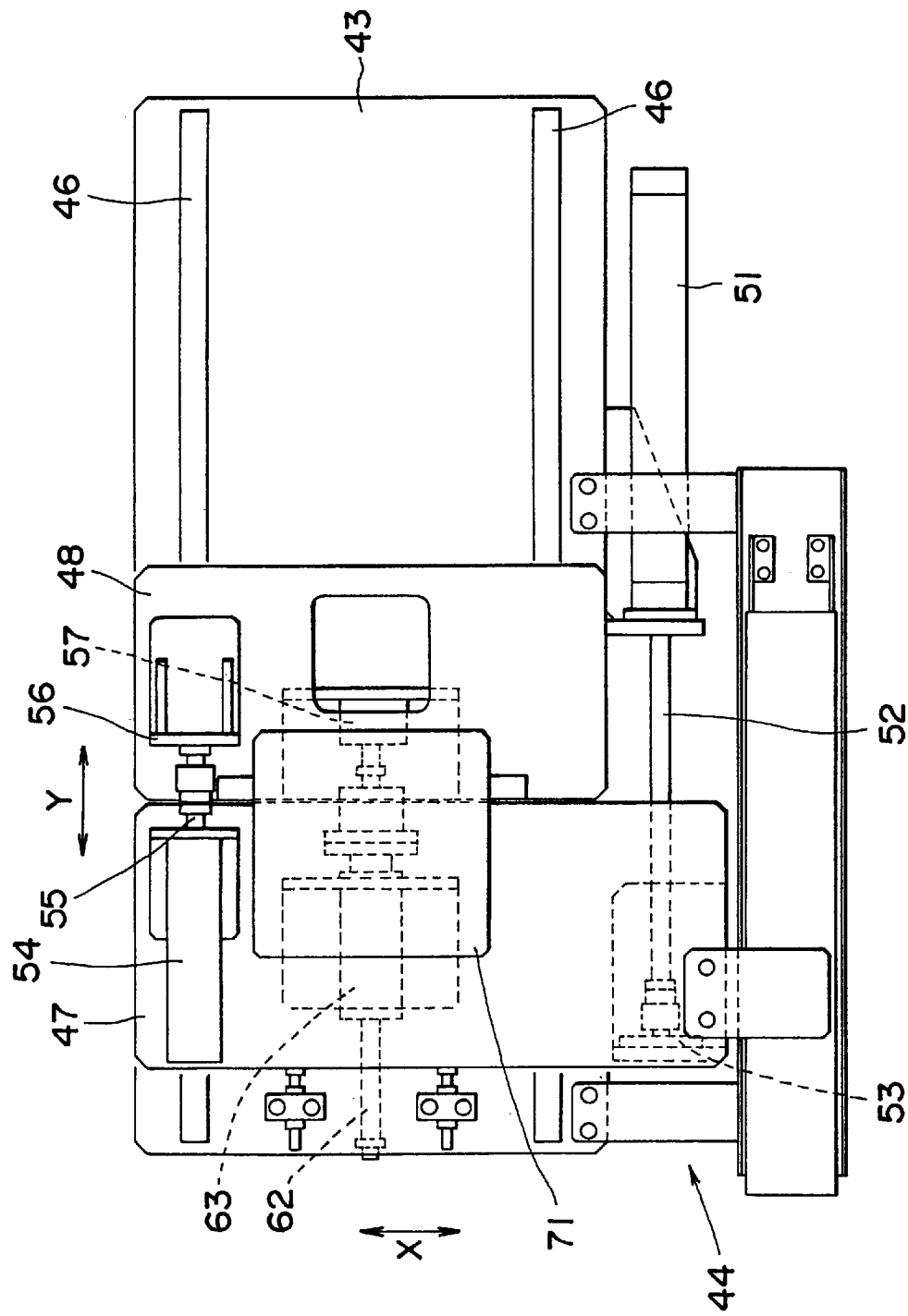
FIG. 7 is a front view of the torque converter moving mechanism.

As shown in FIG. 6 and FIG. 7, a pair of parallel guide rails 46 are fixed on the supporting plate 43. On the guide rails 46 are movably supported a moving plate 47 and an inserting plate 48 via guide members 49, 50. The moving plate 47 is wider on one side than the inserting plate 48, and a front end portion of a driving rod 52 of a driving cylinder 51 mounted on the lower surface of the supporting plate 43 is coupled to a coupling bracket 53 fixed to a side portion of the moving plate 47. On the upper surface of the moving plate 47 is mounted an inserting cylinder 54 having a driving rod 55, whose front end portion is coupled to a coupling bracket 56 fixed on the inserting plate 48.

Thus, when the driving cylinder 51 is driven, the driving rod 52 can extend or retract, moving the moving plate 47 along the guide rails 46 in the direction of Y. On this occasion, the inserting plate 48 connected to the moving plate 47 via the inserting cylinder 54 can be moved synchronously in the same direction. When the inserting cylinder 54 is driven, the driving rod 55 can extend or retract, moving the inserting plate 48 along the guide rails 46 in the direction of Y. The inserting cylinder 54 houses a pulse detector, which can detect the amount of its actuation, namely, the position to which the inserting plate 48 has been moved.

On the lower surface of the inserting plate 48 is mounted a pusher cylinder 57, and a piston 59 is secured to a front end portion of that pusher rod 58 of the pusher cylinder 57 which extends on the moving plate 47 side. The piston 59 is supported movably inside a cylinder case 60, and is urged in one direction by a compression spring 61. To the cylinder case 60 is secured a supporting rod 62 extending on the moving plate 47 side. On the lower surface of the moving plate 47 is mounted a pneumatic lock holding tube 63, which is fitted with a supporting rod 62. The pusher cylinder 57 has an inside diameter larger than that of the inserting cylinder 54.

Thus, when the pusher cylinder 57 is driven, the pusher rod 58 can extend or retract, moving the supporting rod 62 axially via the piston 59, cylinder case 60 and compression spring 61. If, at this time, the pneumatic lock holding tube 63 is in a locking condition and restrains the supporting rod 62, the supporting rod 62 will be connected to the moving plate 47 via the lock holding tube 63. Thus, when the pusher rod 58 extends or retracts upon driving of the pusher cylinder 57, the inserting plate 48 can be moved in the direction of Y relative to the moving plate 47. If, on this occasion, the inserting cylinder 54 is in operation, the pusher cylinder 57 outperforms the inserting cylinder 54, moving the inserting plate 48.

Figure 2:
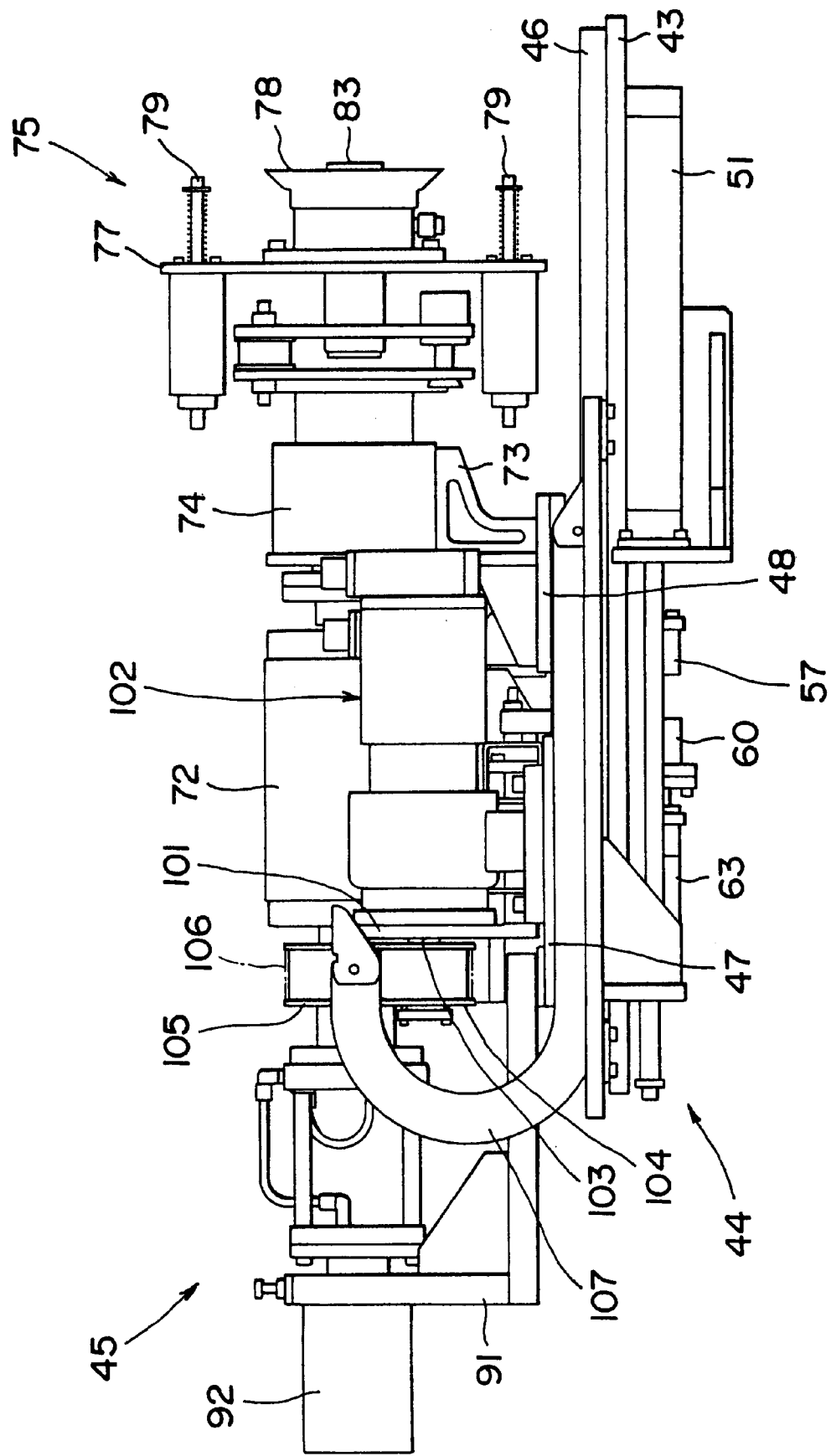
FIG. 2 is a front view of a torque converter inserting device for use in the torque converter assembling apparatus of the instant embodiment.
Figure 3:
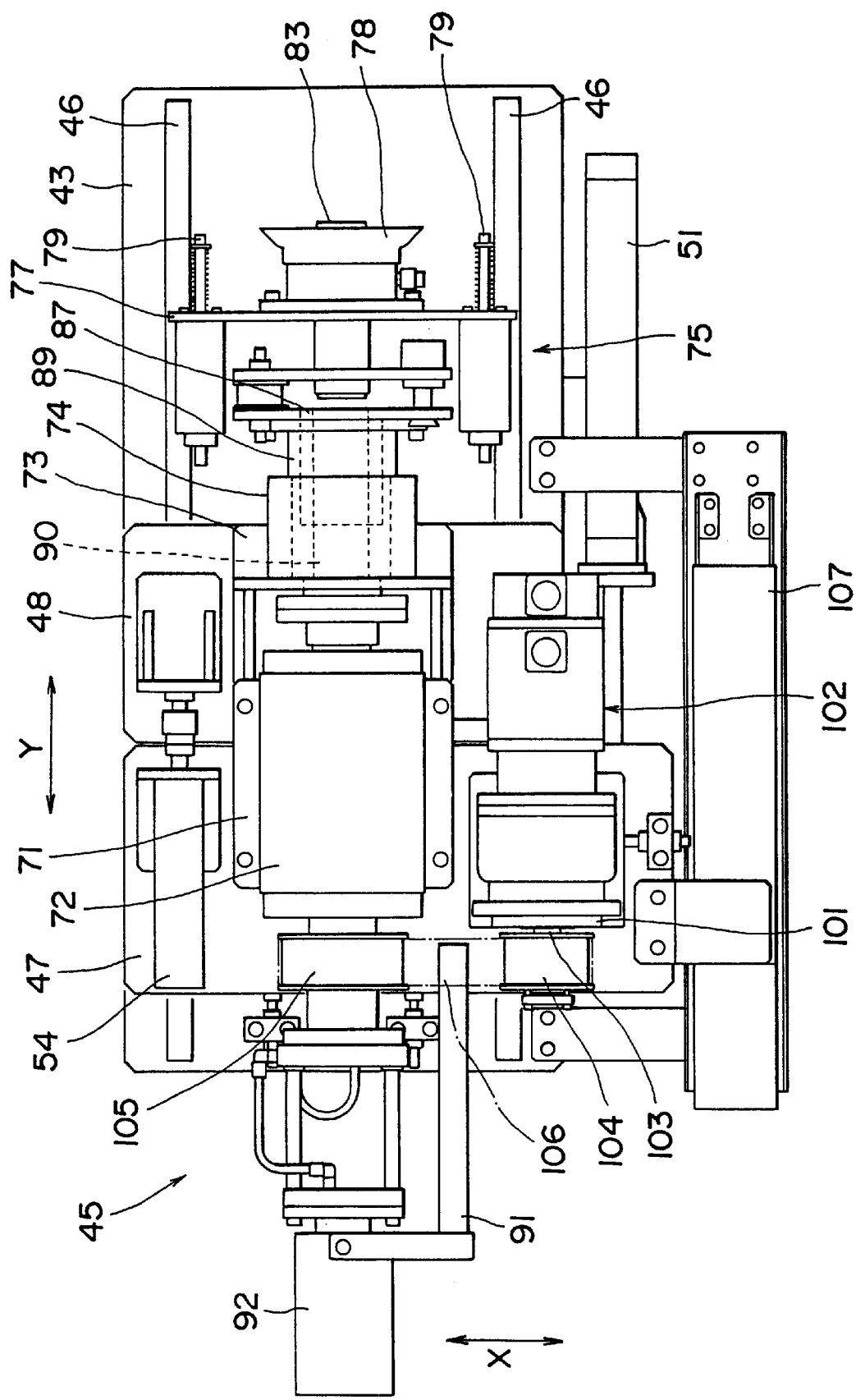
FIG. 3 is a plan view of the torque converter inserting device.
Figure 4:
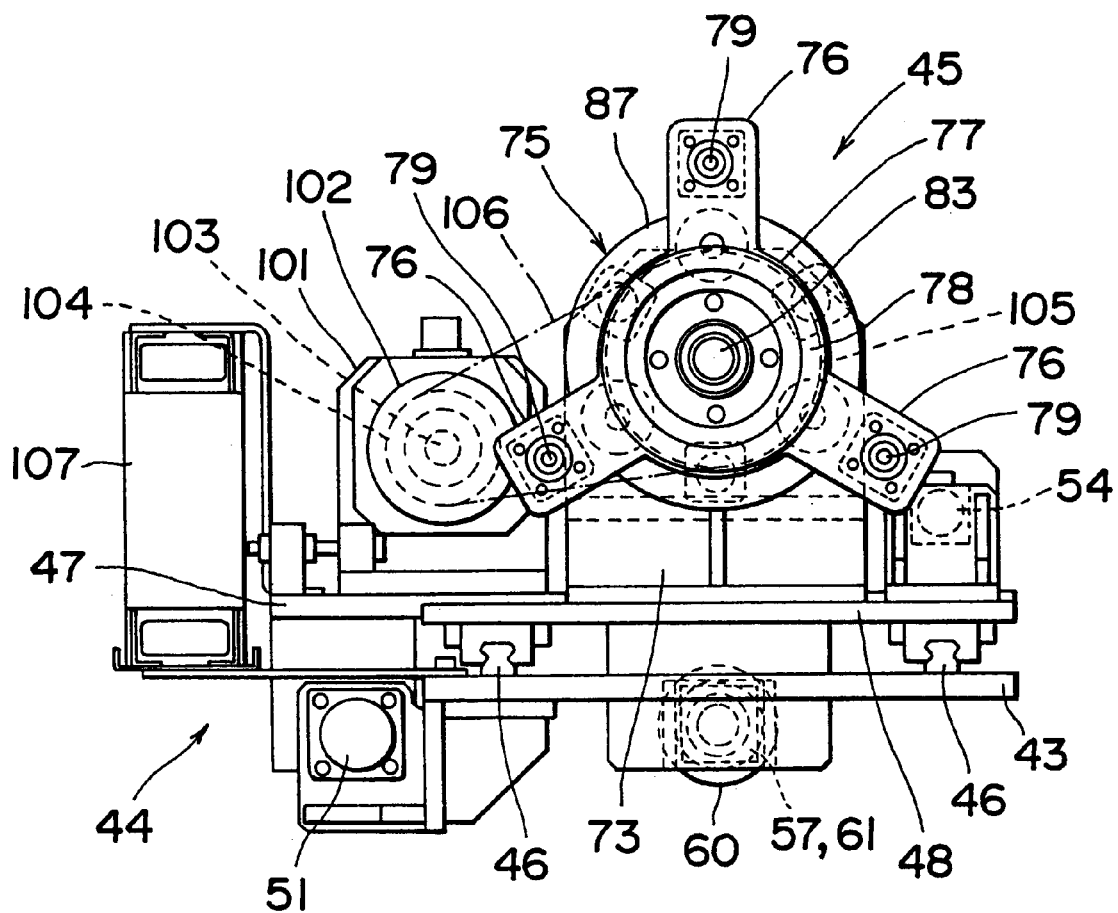
FIG. 4 is a side view of the torque converter inserting device.

Next, the torque converter inserting machine 45 supported by the torque converter moving mechanism 44 will be described. In the torque converter inserting machine 45, as shown in FIG. 2, FIG. 3 and FIG. 4, a supporting panel 71 is fixed on the moving plate 47, and a bearing tube 72 is attached to the supporting panel 71. Onto the inserting plate 48, on the other hand, a bearing tube 74 is similarly attached by a supporting bracket 73.

A torque converter holding portion 75 of the torque converter inserting machine 45 can hold the torque converter TC attracted thereto. That is, as shown in detail in FIG. 4 and FIG. 5, a suction pad 78 attracting the torque converter TC is mounted on a central portion of a rotating plate 77 having extending portions 76 extending radially in three directions. On each extending portion 76 is supported a positioning pin 79 via a compression spring 80 which urges the positioning pin 79. The movement of the positioning pin 79 can be restrained by a cell top cylinder 81. On the rear surface of a central portion of the rotating plate 77 is fixed a holding member 82, which supports a centering member 83, receiving the boss portion 17 of the torque converter TC, via a compression spring 84 urging the centering member 83. A coupling plate 85 fixed to the holding member 82 is supported so as to be slightly movable perpendicularly to a mounting plate 87 via a rubber mount 86, and is adapted to be positioned by a positioning cylinder 88.

Figure 5:
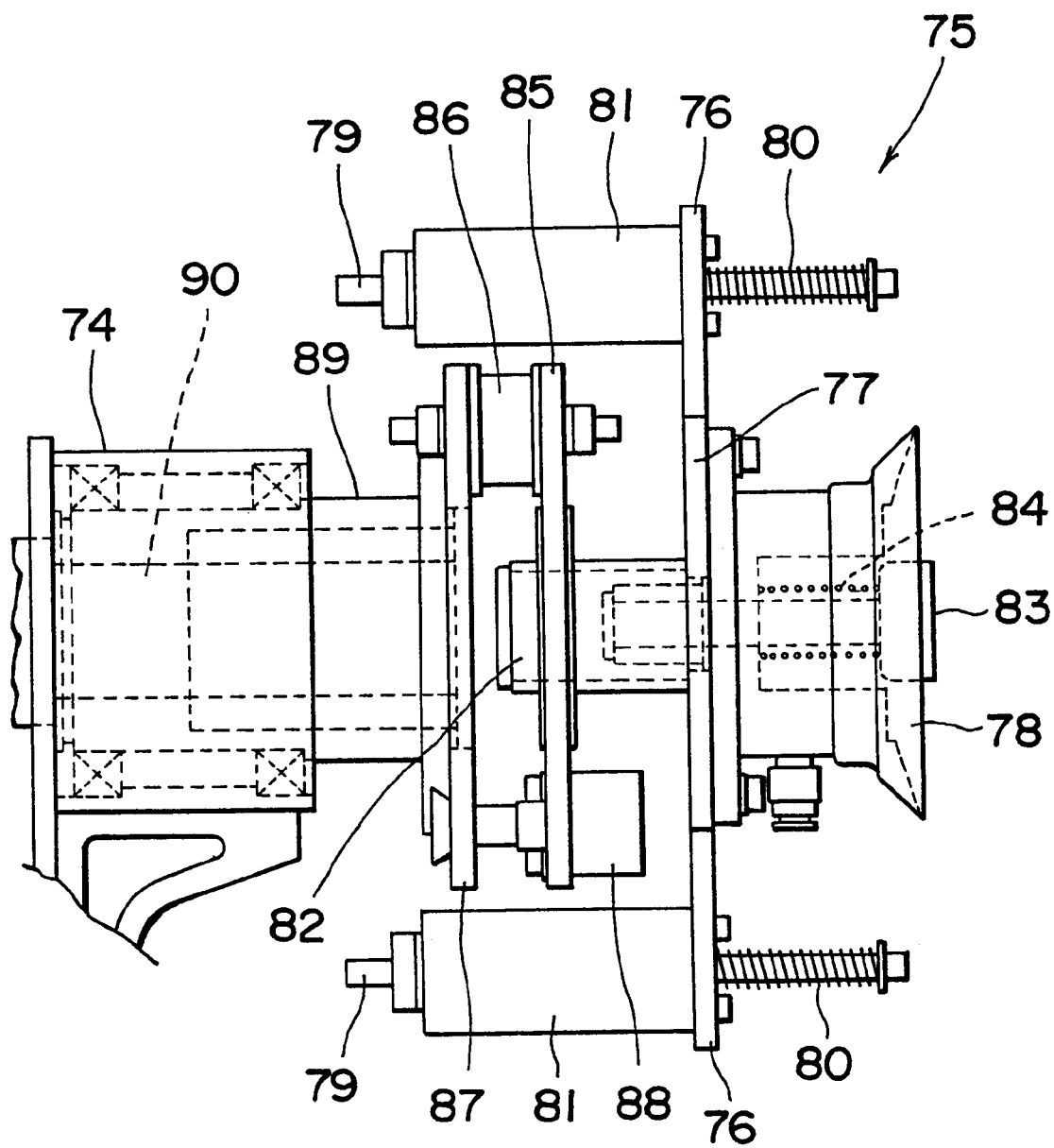
FIG. 5 is a front view of a torque converter holding portion.

The mounting plate 87 is secured to an end portion of a rotating tube 89, as shown in FIG. 5, FIG. 2 and FIG. 3, and the rotating tube 89 is supported rotatably in the bearing tube 74 attached to the inserting plate 48. To the other end portion of the rotating tube 89 is integrally fitted and coupled an end portion of a rotating shaft 90. The other end portion of the rotating shaft 90 extends rearwards (leftwards in FIG. 5 and FIG. 3) through the bearing tube 74, and passes into the bearing tube 72 attached to the moving plate 47. Thus, the rotating shaft 90 is supported rotatably and axially movably. Furthermore, the other end portion of the rotating shaft 90 passed into the bearing tube 72 is supported rotatably by a rotary joint 92 attached to the moving plate 47 by a bracket 91. To the rotary joint 92 is connected an air supply and exhaust device (not shown). The air supply and exhaust device is connected to the suction pad 78 via an air passage formed in the rotating shaft 90.

On the moving plate 47 is erected a mounting wall 101 adjacently to the bearing tube 72. To the mounting wall 101 is attached a driving rotary unit 102 comprising a servomotor and reduction gears, and a driving pulley 104 is secured to its output shaft 103. On the aforementioned rotating shaft 90 is keyed a driven pulley 105 so as to be relatively movable in the axial direction and integrally rotatable in the peripheral direction. Between the driving pulley 104 and the driven pulley 105 is looped an endless timing belt 106. To the moving plate 47 is attached a tubular curved piping passage 107 adjacently to the driving rotary unit 102. The piping passage 107 can accommodate a wiring for current supply to the driving rotary unit 102.

Thus, the air supply and exhaust device vacuumizes the suction pad 78 through the air passage formed in the rotating shaft 90, thereby enabling the suction pad 78 to attract and hold the torque converter TC. When the driving rotary unit 102 is driven in this condition to rotate the driving pulley 104, the driven pulley 105 is rotated via the timing belt 106. The rotating shaft 90 is also rotated, permitting the rotation of the torque converter TC that the suction pad 78 has attracted and held. At this time, even if the moving plate 47 and the inserting plate 48 make relative movements, the suction pad 78 supported on the inserting plate 48 via the bearing tube 74 and the rotating shaft 90 moves along with the inserting plate 48 while holding the torque converter TC.

The assembly operation by the torque converter assembling apparatus 25 of the foregoing embodiment will be described based on the flow chart shown in FIG. 9 to FIG. 11.

Figure 9:
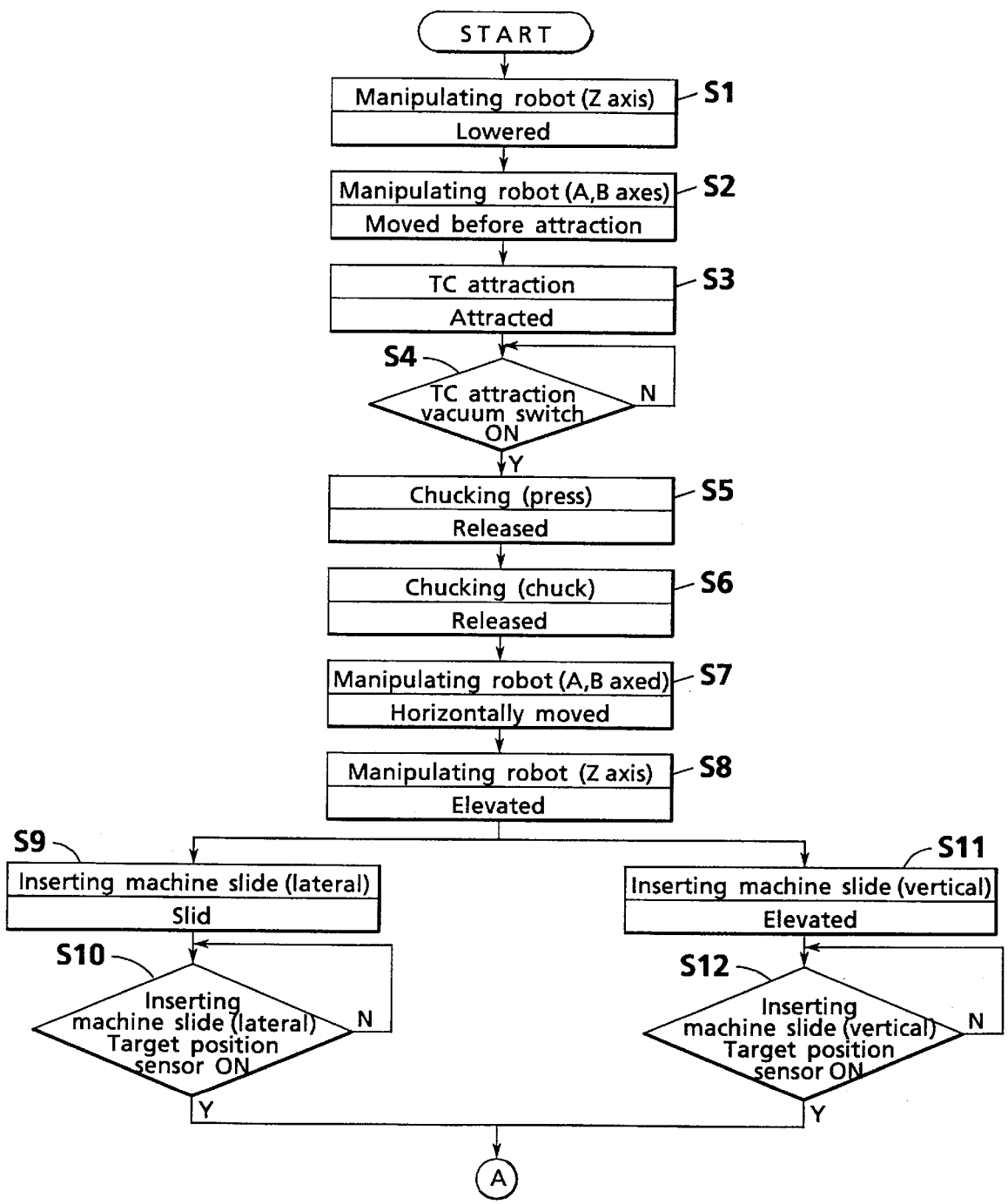
FIG. 9 is a flow chart showing a torque converter assembly operation.

As shown in FIG. 8 and FIG. 9, the transmission TM is conveyed by the pallet 23 on the conveyor 21, while the torque converter TC is conveyed by the pallet 24 on the conveyor 22. For this purpose, plural kinds of the transmissions TM's are conveyed to the conveyor 21 according to the order of production previously determined. Likewise, plural kinds of the torque converters TC's are conveyed to the conveyor 22 according to the order of production previously determined.

At step S1, the manipulating robot 26 descends to hold the torque converter TC on the pallet 24. At step S2, the manipulating robot 26 horizontally moves to bring the held torque converter TC face-to-face with the torque converter assembling apparatus 25. Then, the manipulating robot 26 presses the held torque converter TC against the suction pad 78 provided in the torque converter inserting machine 45 of the torque converter assembling apparatus 25. At step S3, the torque converter assembling apparatus 25 (torque converter inserting machine 45) begins attracting the torque converter TC by the suction pad 78, and generates a vacuum to hold the torque converter TC. At step S4, it is confirmed whether a vacuum switch is ON or not, namely, whether the suction pad 78 is in a vacuum. If it is under vacuum, the procedure moves to step S5. At steps S5 and S6, chucking of the torque converter TC by the manipulating robot 26 is released. At steps S7 and S8, the manipulating robot 26 horizontally moves and ascends for retreat. At this time, the movement of each positioning pin 79 is restrained by the three cell top cylinders 81, so that when the front end of each positioning pin 79 contacts the torque converter TC being held by the suction pad 78 of the torque converter holding portion 75, the torque converter TC can be held properly.

Then, as shown in FIG. 1 and FIG. 9, the horizontal cylinder 41 is driven at steps S9 and S10 to move the moving plate 39 and the supporting plate 43, thereby moving the torque converter inserting machine 45 on the supporting plate 43 horizontally (laterally), and positioning it at a predetermined position. Simultaneously with this movement, the lifting and lowering cylinder 36 is driven at steps S11 and S12 to lift the ascending and descending plate 34, thereby moving the torque converter inserting machine 45 on the supporting plate 43 upwards (vertically), and positioning it at a predetermined position.

Figure 10:
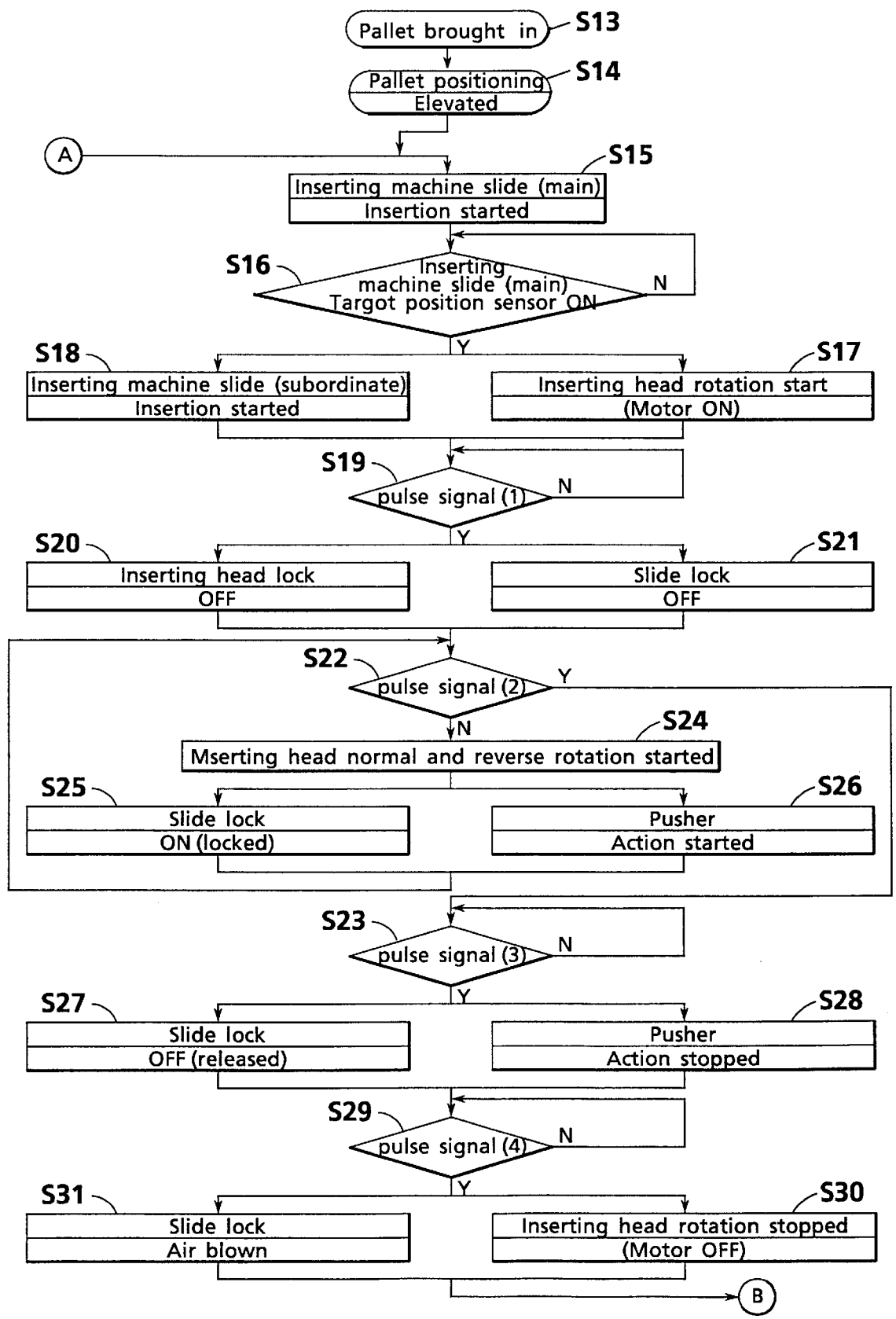
FIG. 10 is a flow chart showing the torque converter assembly operation.
Figure 11:
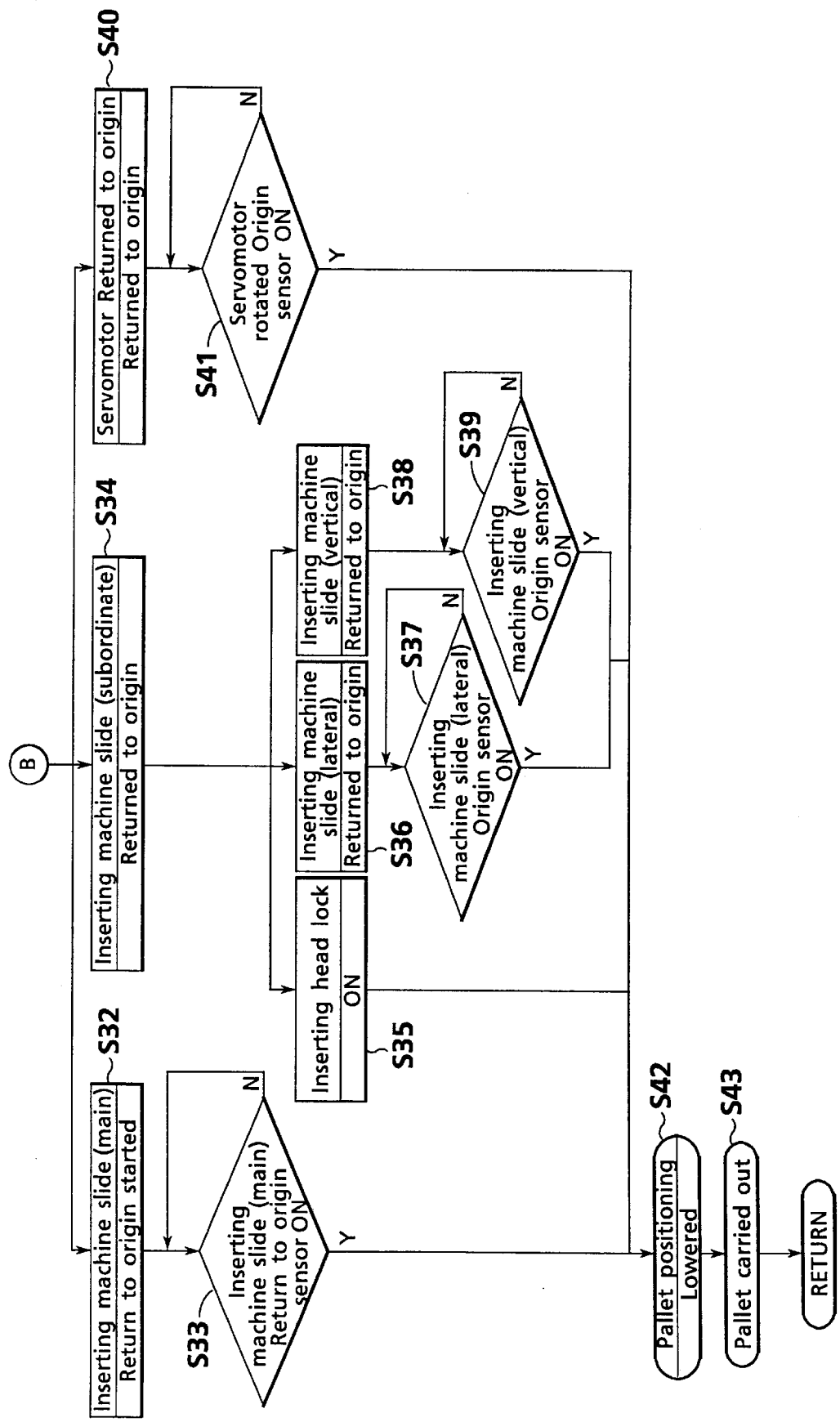
FIG. 11 is a flow chart showing the torque converter assembly operation.

As shown in FIG. 1 and FIG. 10, at steps S13 and S14 the transmission TM carried on the pallet 23 is positioned at a predetermined position on the conveyor 21. In this condition, as shown in FIG. 1 to FIG. 3 and FIG. 10, the torque converter moving mechanism 44 is actuated to cause the torque converter inserting machine 45 to assemble the torque converter TC to the transmission TM.

That is, at step S15, the driving cylinder 51 is driven to move the moving plate 47. The inserting plate 48 connected to the moving plate 47 via the inserting cylinder 54 is also moved in the same direction to advance the torque converter inserting machine 45 holding the torque converter TC. At step S16, when the torque converter inserting machine 45 moves forward to a predetermined position, a sensor is turned on, stopping the driving of the driving cylinder 51, and also halting the inserting plate 48 (the torque converter inserting machine 45 holding the torque converter TC). At step S17, the driving rotary unit 102 is driven to rotate the rotating shaft 90 via the driving pulley 104, timing belt 106 and driven pulley 105, thereby rotating the torque converter TC attracted to the suction pad 78 to perform its centering. At step S18, the inserting cylinder 54 is driven to move the inserting plate 48 relative to the moving plate 47, thereby advancing the torque converter inserting machine 45 holding the torque converter TC.

Figure 14:
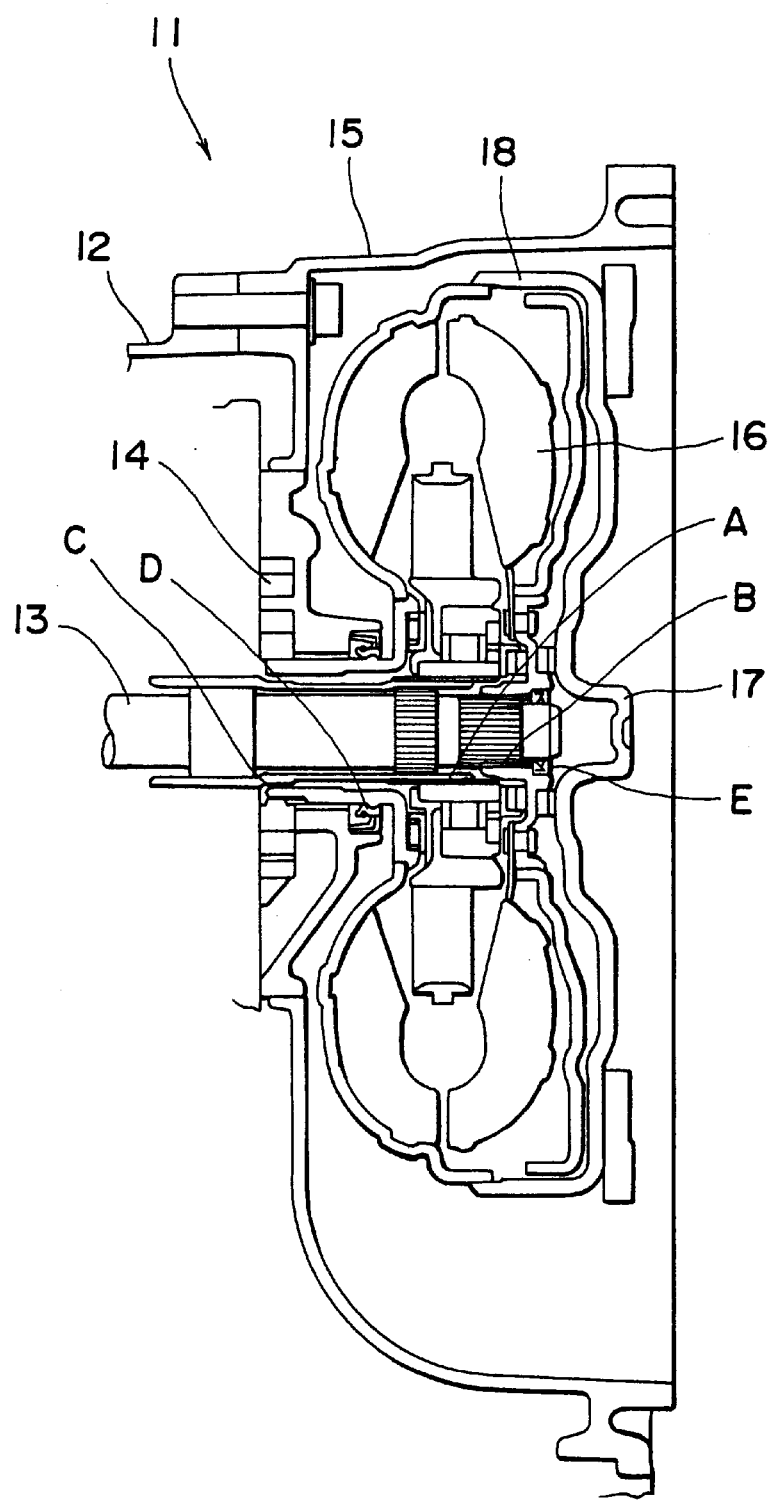
FIG. 14 is a schematic representation of an ordinary transmission having the torque converter assembled to it.

At step 19, the position which the inserting plate 48 has been moved to is detected by the pulse detector inside the inserting cylinder 54. At this step, a pulse signal (1) is produced at a position where the torque converter TC held by the torque converter holding portion 75 is positioned on the conveyor 21 and contacts the transmission TM, namely, where an end portion of the splined hole of the torque converter TC contacts the front end of the input shaft 13 of the transmission TM (for this position, see FIG. 14). When the held torque converter TC moves to the position for the pulse signal (1), the driving of the positioning cylinder 88 is stopped at step S20, whereupon some alignment is performed between the torque converter TC attracted by the suction pad 78 and the transmission TM on a plane, where they face, by the rubber mount 86 via the rotating plate 77. At step S21, air is supplied to the pneumatic lock holding tube 63 to achieve an unlocking state, thereby releasing the restraint of the supporting rod 62 coupled to the pusher rod 58 of the pusher cylinder 57.

At step S22, the position which the inserting plate 48 has been moved to is detected by the pulse detector inside the inserting cylinder 54. At this step, a pulse signal (2) is produced at a position where the input shaft 13 of the transmission TM is fitted into the splined hole of the torque converter TC, namely, where a splined fitting portion A is fitted (for this position, see FIG. 14). When the held torque converter TC moves to the position for the pulse signal (2), the procedure moves to step S23. If the input shaft 13 of the transmission TM fails to be fitted into the splined hole of the torque converter TC, this means that there is a shift in their peripheral phases. In this case, the procedure moves to step S24.

At step S24, the rotating shaft 90 is rotated normally and reversely at regular intervals by the driving rotary unit 102. Likewise, the torque converter TC attracted to the suction pad 78 is rotated normally and reversely at regular intervals. At step S25, air supply to the pneumatic lock holding tube 63 is stopped to produce a locking state, thereby restraining the supporting rod 62 coupled to the pusher rod 58 of the pusher cylinder 57. In this condition, at step S26, the pusher cylinder 57 is driven to cause the pusher rod 58 to repeat extension and retraction at predetermined intervals, thus causing the supporting rod 62 to extend and retract axially via the piston 59, cylinder case 60 and compression spring 61. On this occasion, the supporting rod 62 is restrained by the pneumatic lock holding tube 63, so that the inserting plate 48, and accordingly, the torque converter TC held by the torque converter holding portion 75, is caused to make a fine reciprocating motion in the back-and-forth direction by the extensive and retractile driving of the pusher cylinder 57. During the extending and retracting motion of the pusher cylinder 57, the inserting cylinder 54 is in operation, but the pusher cylinder 57 is larger in inside diameter than the inserting cylinder 54; therefore, the pusher cylinder 57 overrules the actuating force of the inserting cylinder 54, moving the inserting plate 48.

By such actions at steps S24, S25 and S26, the torque converter TC held by the torque converter holding portion 75 makes fine reciprocating movements in the back-and-forth direction while making peripheral normal and reverse rotations so that the splined hole of the torque converter TC and the input shaft 13 of the transmission TM will align in terms of the phase of rotation of the splined fitting portion A. When the phase of rotation of the fitting portion A achieves the alignment, the inserting cylinder 54 is in an operative condition. Thus, regardless of the state of action of the pusher cylinder 57, the torque converter TC moves forward together with the inserting plate 48, bringing the splined fitting portion A into a fit.

At step S23, the position which the inserting plate 48 has been moved to is detected by the pulse detector inside the inserting cylinder 54. At this step, a pulse signal (3) is produced at a position where the input shaft 13 of the transmission TM is fitted into the splined hole of the torque converter TC, namely, where a splined fitting portion B is fitted (for this position, see FIG. 14). When the held torque converter TC moves to the position for the pulse signal (3), the procedure moves to steps S27 and S28. At these steps, air is fed to the pneumatic lock holding tube 63 to bring an unlocking state and halt the driving of the pusher cylinder 57, terminating the back-and-forth movement of the inserting plate 48.

At step S29, the position which the inserting plate 48 has been moved to is detected by the pulse detector inside the inserting cylinder 54. At this step, a pulse signal (4) is produced at a position where the input shaft 13 of the transmission TM is fitted into the fitting hole of the torque converter TC, namely, where an oil pump fitting portion C is fitted (for this position, see FIG. 14). When the held torque converter TC moves to the position for the pulse signal (4), the procedure moves to steps S30 and S31. At these steps, the driving of the driving rotary unit 102 is stopped, whereupon the rotation of the torque converter TC attracted to the suction pad 78 is also stopped. The vacuum switch is turned off to release the torque converter TC from being held by the suction pad 78 of the torque converter holding portion 75.

The five fitting portions, i.e., the two splined fitting portions A and B, oil pump fitting portion C, and oil seal fitting portions D and E (see FIG. 14) are fitted in the above manner, whereby the torque converter TC is assembled to the transmission TM.

After completion of assembly, the driving cylinder 51 is driven at steps S32 and S33 (FIG. 11) in a manner reverse to the foregoing to retract the moving plate 47 and the inserting plate 48, returning the torque converter inserting machine 45 to the position of the origin, as shown in FIG. 1. Simultaneously, at step S34, the inserting cylinder 54 is driven reversely to what has been mentioned earlier. Thus, the inserting plate 48 is brought close to the moving plate 47, returning the torque converter inserting machine 45 to the position of the origin. At step S35, the positioning cylinder 88 is driven to set the suction pad 78 in place. At steps S36 and S37, the horizontal cylinder 41 is driven to move the torque converter inserting machine 45 on the supporting plate 43 horizontally (laterally), returning it to the position of the origin. At steps S38 and S39, the lifting and lowering cylinder 36 is driven to lower the ascending and descending plate 34, whereby the torque converter inserting machine 45 is moved downwards (vertically) to return it to the position of the origin. Likewise, at steps S40 and S41, the driving rotary unit 102 is driven to return it to the position of the origin.

At step S42, the transmission TM assembled with the torque converter TC on the pallet 23 is lowered. At step S43, the conveyor 21 is driven to carry the resulting assembly out, and a transmission TM to be assembled is carried in.

Figure 12:
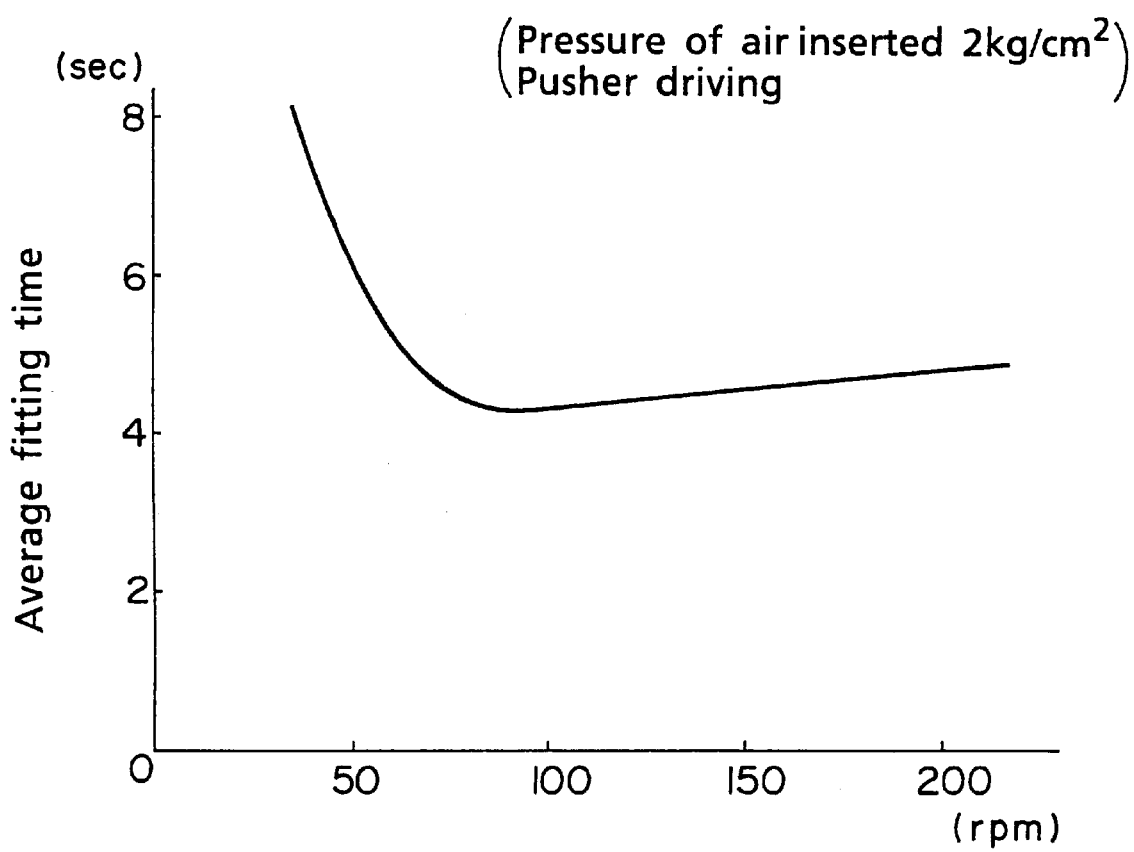
FIG. 12 is a graph showing the average fitting time versus the number of revolutions of the torque converter.

In the instant embodiment, the held torque converter TC is advanced while being rotated by the driving rotary unit 102 so as to be fitted with the input shaft 13 of the transmission TM. In this case, the rate of rotations of the torque converter TC is appropriately 70 to 200 rpm, as shown in a graph of FIG. 12.

Figure 13:
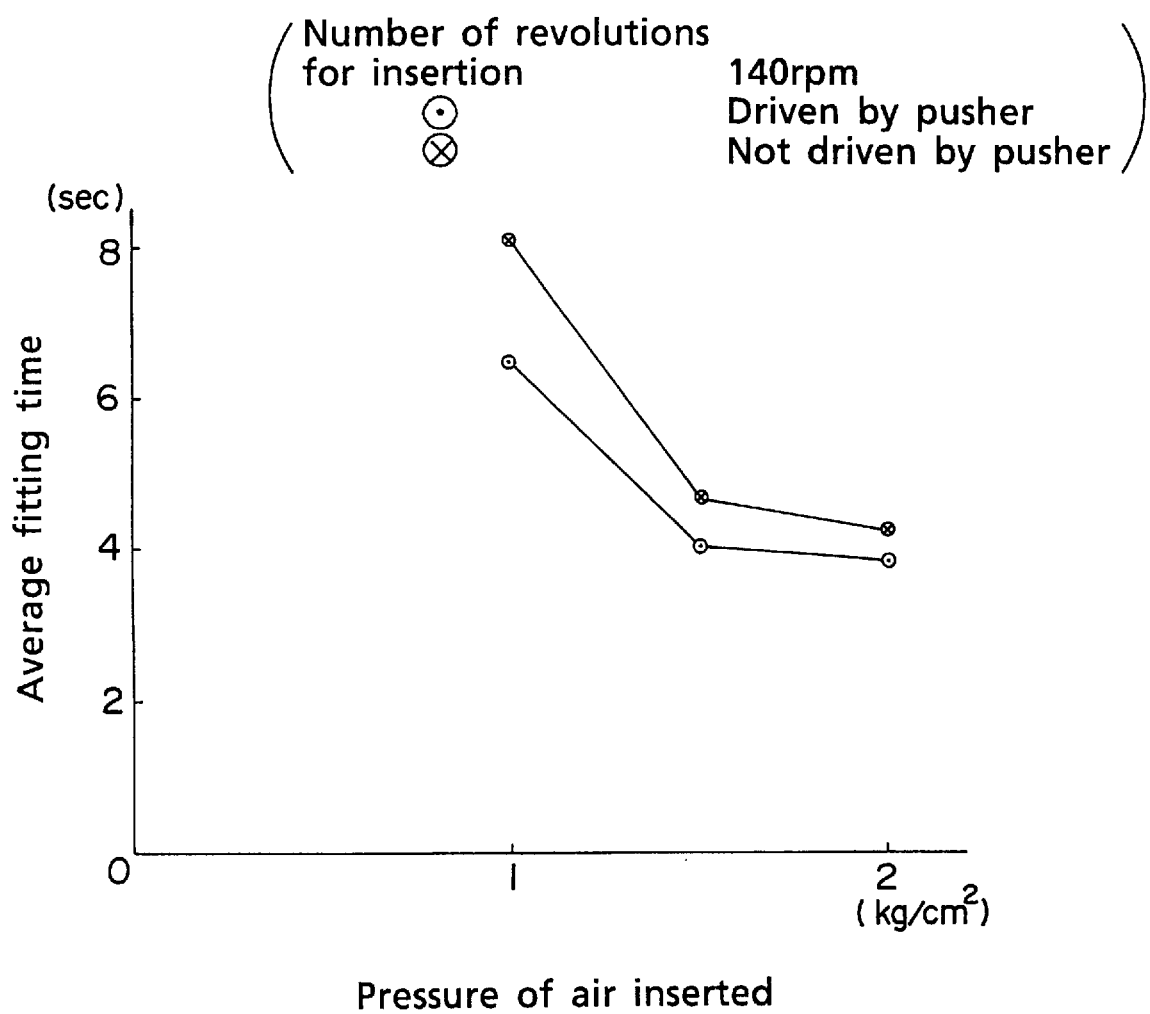
FIG. 13 is a graph showing the average fitting time versus the pressure of air inserted in the presence or absence of a torque converter advancing or retracting motion.

In the instant embodiment, moreover, the held torque converter TC is rotated normally and reversely by the driving rotary unit 102 and caused to reciprocate in the back-and-forth direction by the pusher cylinder 57 so as to be fitted with the input shaft 13 of the transmission TM. In this case, as shown in a graph of FIG. 13, the fitting time is shorter than when no back-and-forth reciprocating motion is made by the pusher cylinder 57.

In the above-mentioned embodiment, furthermore, if the input shaft 13 of the transmission TM and the splined fitting portion A of the torque converter TC are not fitted together, the torque converter TC is caused to reciprocate back and forth by the pusher cylinder 57 so as to be fitted thereto. If the torque converter TC fails to be fitted at the position of the splined fitting portion B or the oil pump fitting portion C, the torque converter TC may be caused to reciprocate back and forth by the pusher cylinder 57 so as to be fitted thereto.

In this embodiment, the workpiece assembling apparatus of the present invention has been described by applying it to a torque converter assembling apparatus for assembling a torque converter to a transmission. However, it is in no way limited thereto. The invention may be varied in many ways. Such variations are not to be regarded as a departure from the spirit and scope of the invention, and all such modifications as would be obvious to one skilled in the art are intended to be included within the scope of the following claims.

We claim:

1. A workpiece assembling apparatus for assembling a transmission having a co-axial inner spline shaft and outer spline shaft, with a torque converter having a turbine wheel to be fitted to the inner spline shaft and a stator to be fitted to the outer spline shaft, by positioning the transmission at a predetermined position, moving the torque converter close to the transmission, and thus fitting them together, the apparatus comprising:

a moving table supported on a base unit so as to move toward or away from the transmission, wherein said moving table is divided into a front moving table and a rear moving table, said front moving table and said rear moving table being movable relative to each other, said front moving table is provided with a torque converter holding means;

a moving table driving means for moving said moving table horizontally;

a torque converter holding means provided on said moving table for holding the torque converter such that the turbine wheel and the stator face towards the inner spline shaft and outer spline shaft;

a torque converter rotating means for rotating the torque converter normally and reversely about a rotational axis of the turbine wheel and stator such that the inner spline shaft is fitted to the turbine wheel and the outer spline shaft is fitted to the stator; and a torque converter advancing and retracting means for moving the torque converter horizontally while said torque converter rotating means is rotating with respect to the transmission wherein said torque converter advancing and retracting means are disposed between said front and rear moving tables via a locking means, and when said torque converter advancing and retracting means is driven, said locking means is actuated so that said torque converter advancing and retracting means can advance or retract.

2. The workpiece assembling apparatus according to claim 1, further comprising workpiece fitting detecting means for detecting the state of fitting of the transmission and torque converter, and if said workpiece fitting detecting means detects that the transmission and torque converter are not fitted together even after the torque converter is moved to a fitting position, then said torque converter advancing and retracting means advances or retracts the torque converter for a retry operation.

3. The workpiece assembling apparatus according to claim 1 wherein when the transmission and torque converter are not fitted together, said torque converter rotating means starts to rotate the torque converter normally or reversely at regular intervals.

4. The workpiece assembling apparatus according to claim 1, wherein said moving table is provided with said torque converter rotating means, and further comprising driving force transmitting means which, regardless of the relative positions of the front moving table and the rear moving table, transmit a rotating force of said torque converter rotating means to rotate the torque converter.

5. The workpiece assembling apparatus according to claim 1 wherein a rotation rate at which the torque converter is rotated by said rotating means before fitting is in the range of 70 to 200 rpm.

6. A workpiece assembling apparatus for assembling a transmission having a co-axial inner spline shaft and outer spline shaft, with a torque converter having a turbine wheel to be fitted to the inner spline shaft and a stator to be fitted to the outer spline shaft, by positioning the transmission at a predetermined position, moving the torque converter close to the transmission, and thus fitting them together, the apparatus comprising:

a positioning means for holding the transmission at said predetermined position;

a base unit having a driving means for aligning a rotational axis of the turbine wheel and the stator with respect to the inner spline shaft and outer spline shaft;

a moving table supported on said base unit so as to move horizontally toward or away from the transmission;

a moving table driving means for moving said moving table horizontally;

a torque converter holding means provided on said moving table for holding the torque converter such that the turbine wheel and the stator face towards the inner spline shaft and outer spline shaft;

a torque converter rotating means for rotating the torque converter normally and reversely about a rotational axis of the turbine wheel and stator such that the inner spline shaft is fitted to the turbine wheel and the outer spline shaft is fitted to the stator;

a torque converter advancing and retracting means for moving the torque converter horizontally while said torque converter rotating means is rotating the torque converter; and, a workpiece fitting detecting means for detecting the state of fitting the transmission and torque converter.

7. A workpiece assembling apparatus according to claim 5 wherein, if said workpiece fitting detecting means detects that the transmission and torque converter are not fitted together even after the transmission is moved to a fitting position, then said torque converter advancing and retracting means advances or retracts the transmission for a retry operation.

8. A workpiece assembling method for assembling a transmission having a co-axial inner spline shaft and outer spline shaft, with a torque converter having a turbine wheel to be fitted to the inner spline shaft and a stator to be fitted to the outer spline shaft, by positioning the transmission at a predetermined position, moving the torque converter close to the transmission, and thus fitting them together, the method comprising the steps of:

positioning and holding the transmission at the predetermined position;

holding the torque converter such that the turbine wheel and the stator face towards the inner spline shaft and outer spline shaft of the transmission;

aligning a rotational axis of the turbine wheel and the stator, with respect to a rotational axis of the inner spline shaft and outer spline shaft;

moving the torque converter horizontally about the rotational axis of the turbine wheel and stator such that the inner spline shaft is fitted to the turbine wheel and the outer spline shaft is fitted to the stator;

advancing and retracting the torque converter horizontally so as to move towards or away from the transmission while rotating the torque converter normally and reversely;

repeating said step for advancing and retracting said torque converter horizontally so as to move towards or away from the transmission while rotating the torque converter normally and reversely; and detecting the state of fitting the transmission and torque converter.

\* \* \* \* \*